United States Patent [19]
Chen

[11] Patent Number: 5,239,452
[45] Date of Patent: Aug. 24, 1993

[54] COLOR CHANGING LAMP

[76] Inventor: Liang-Ming Chen, Floor 7, No. 111, Tung Hsing Road, Tainan, Taiwan

[21] Appl. No.: 772,966

[22] Filed: Oct. 8, 1991

[51] Int. Cl.[5] .............................................. F21V 9/00
[52] U.S. Cl. ...................................... 362/293; 362/61; 362/284; 362/234; 362/802; 116/63 R
[58] Field of Search ................. 362/61, 80, 293, 284, 362/324, 802, 234, 253, 806, 811; 116/63 R

[56] References Cited
U.S. PATENT DOCUMENTS

| | | | |
|---|---|---|---|
| 2,136,804 | 11/1938 | Paul | 116/63 R |
| 2,865,017 | 12/1958 | Heikes | 116/63 R |
| 4,974,133 | 11/1990 | Fujiki | 362/811 X |

Primary Examiner—Stephen F. Husar
Attorney, Agent, or Firm—Morton J. Rosenberg; David I. Klein

[57] ABSTRACT

A color changing lamp comprising a lamp, a housing, and a projection shifting device, said lamp fixed on the outside of the housing to reflect the colored light beam coming from the projection shifting device which has a light beam generator, a concave lens to receive the parallel light beam from said generator, a guide plate to limit the focused light beam from the concave lens to pass through its fan-shaped opening to a color disc divided into a plurality of different colored sections, a color disc rotating device to rotate said color disc to position only one of the colored sections to be in line with the guide plate to color the light beam with the color to reach the lamp, which can reflect the colored light beam, and a lighting time indicating device to show the length of lighting time of each color for the lamp.

4 Claims, 9 Drawing Sheets

COLOR CHANGING LAMP

BACKGROUND OF THE INVENTION

As means of advertising a merchandise or a company, an advertising light 1, as shown in FIG. 9, is widely used, consisting of a plurality of lamps with different colors to be lighted on and off. But its structure can be considered to have the following disadvantages.

1. It generally has not a small number of lamps or tubes, to resultant high cost for power energy, complicated assemblage and labor and time waste.
2. The control system for the lamps or tubes is so complicated that its cost cannot be low and, not economical.

Next, a conventional traffic light always has at least three lamps for one side indication and six lamps for both side indication. In case four traffic lights are accomodated at a cross road as shown in FIG. 10, 24 lamps are needed in total. Then it leads to high cost and difficult complexity in its structure and wiring. In addition, conventional traffic lights lack a time indicating device to show the length of time a lamp of red, green or yellow color to be lighted, so drivers may easily run into an accident by guessing changing time of traffic lights to drive their cars. Conventional traffic lights can be considered to have the following disadvantages.

1. They, either of one side or both side indication, are so complicated in fixing and wiring structure and color changing, liable to give baffling impression to passers-by and drivers, and has low economic gain owing to their high cost.
2. They have only a simple function to show go-or-stop sign by changing alternately the three lamps of three separate colors, without any other indications for drivers and walkers.
3. They have a large number of lamps using large amounts of electricity.

As for a headlight and a fog light used in common cars, they are seperate and independent from each other to be used on different occasions, having respectively four lamps requiring rather complicated wiring.

SUMMARY OF THE INVENTION

One of the objects of this invention is to supply a color changing lamp to be applied to an advertising light having a simple structure.

Another object is to supply a color changing lamp applicable to a traffic light, an illumination light, an ornament light, a water show light, a stage light, a headlight and a fog light, etc.

A color changing lamp in the present invention comprises a lamp, a housing for the lamp to be mounted on and for all the other components to be contained in its interior, and a projecting shifting device as its main components.

The lamp has a bulb-shaped cover and a lighting time indication device consisting of a plurality of light emitters, a transparent plate to mount said light emitters thereon and a lighting order and time control circuit to control the lighting of the light emitters so as to indicate the length of time of the lamp to be lighted.

The housing contains the projection shifting device in its interior and the lamp is fixed on its exterior surface.

The projection shifting device comprises a light beam generator, a concave lens located before said generator to focus the parallel light beam coming from said generator to feed the light beam to a guide plate having a fan-shaped opening to limit the focused light beam coming from the concave lens to pass through, a color disc placed before the guide plate and having its entire surface divided into a plurality of different colored sections equally divided in a radial direction, a color disc rotating device to rotate the color disc so that only one of the colored sections can be positioned in line with the guide plate and then the focused light beam can pass through the colored section to provide a colored light beam to the lamp. Then the lamp can reflect the colored light beam as if the lamp is lighted up with that color.

DETAILED DESCRIPTION OF THE INVENTION

Figure 1:
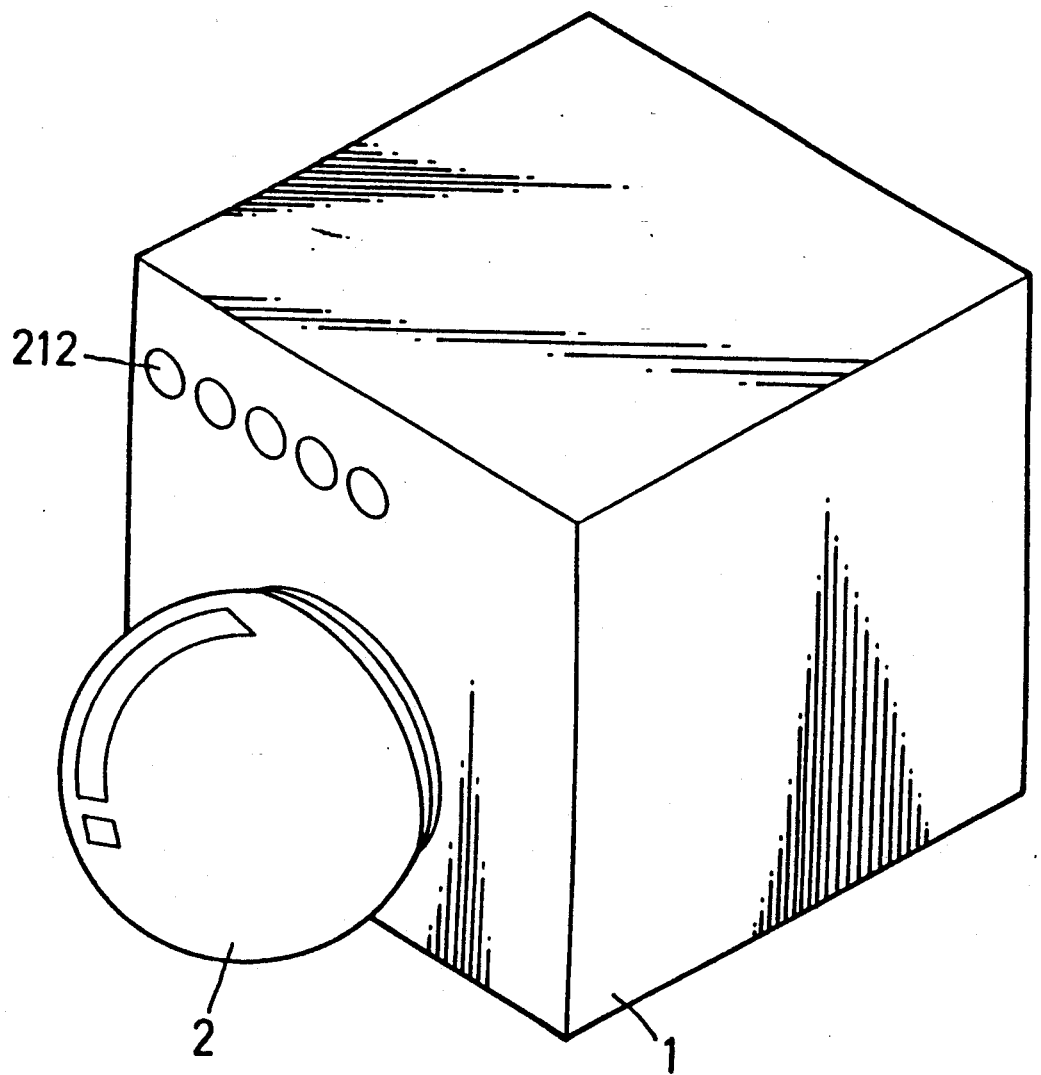
FIG. 1 is a perspective view of a color changing lamp in accordance with the present invention.
Figure 2:
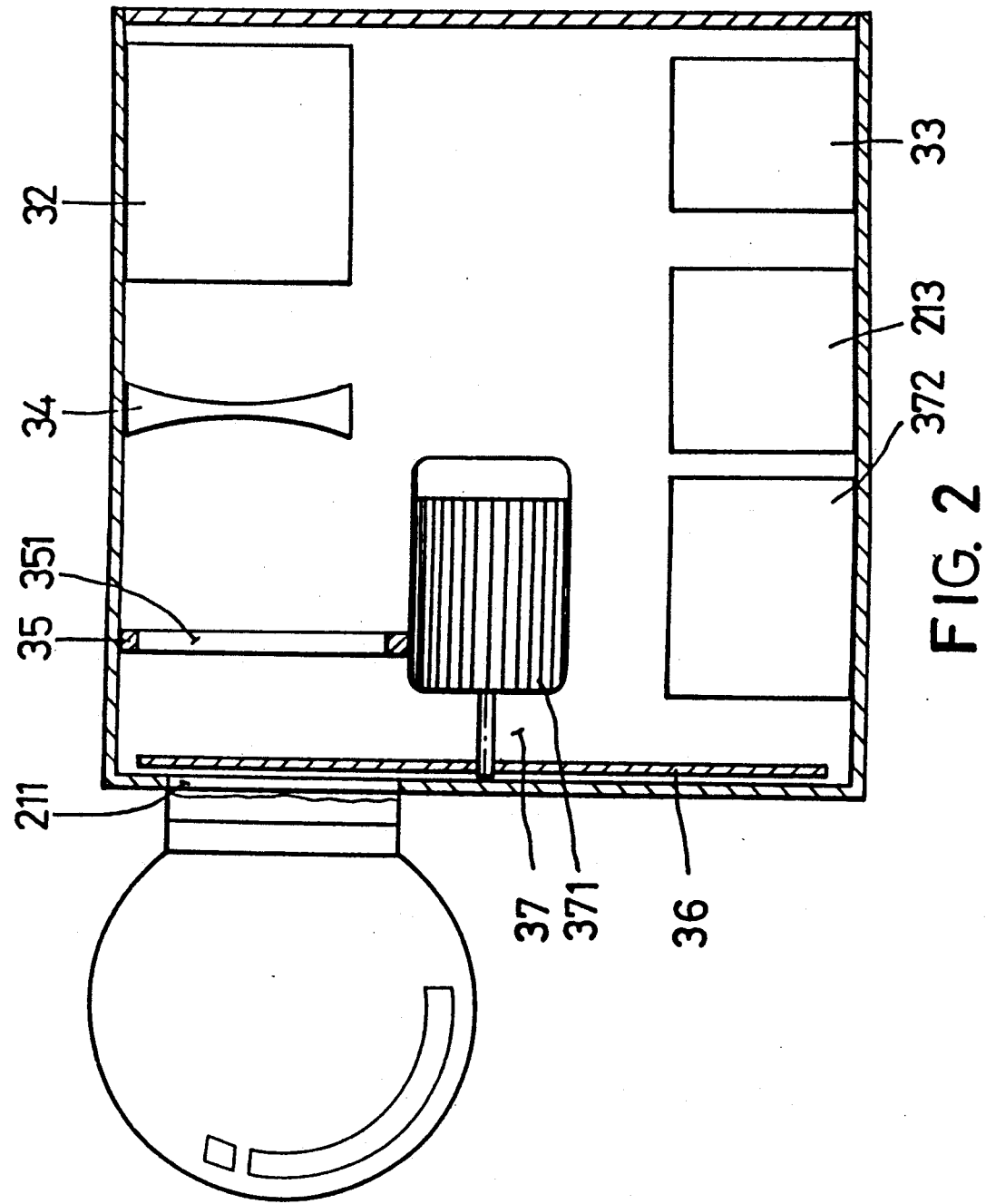
FIG. 2 is a positional view of the components in a color changing lamp in accordance with the present invention.
Figure 3:
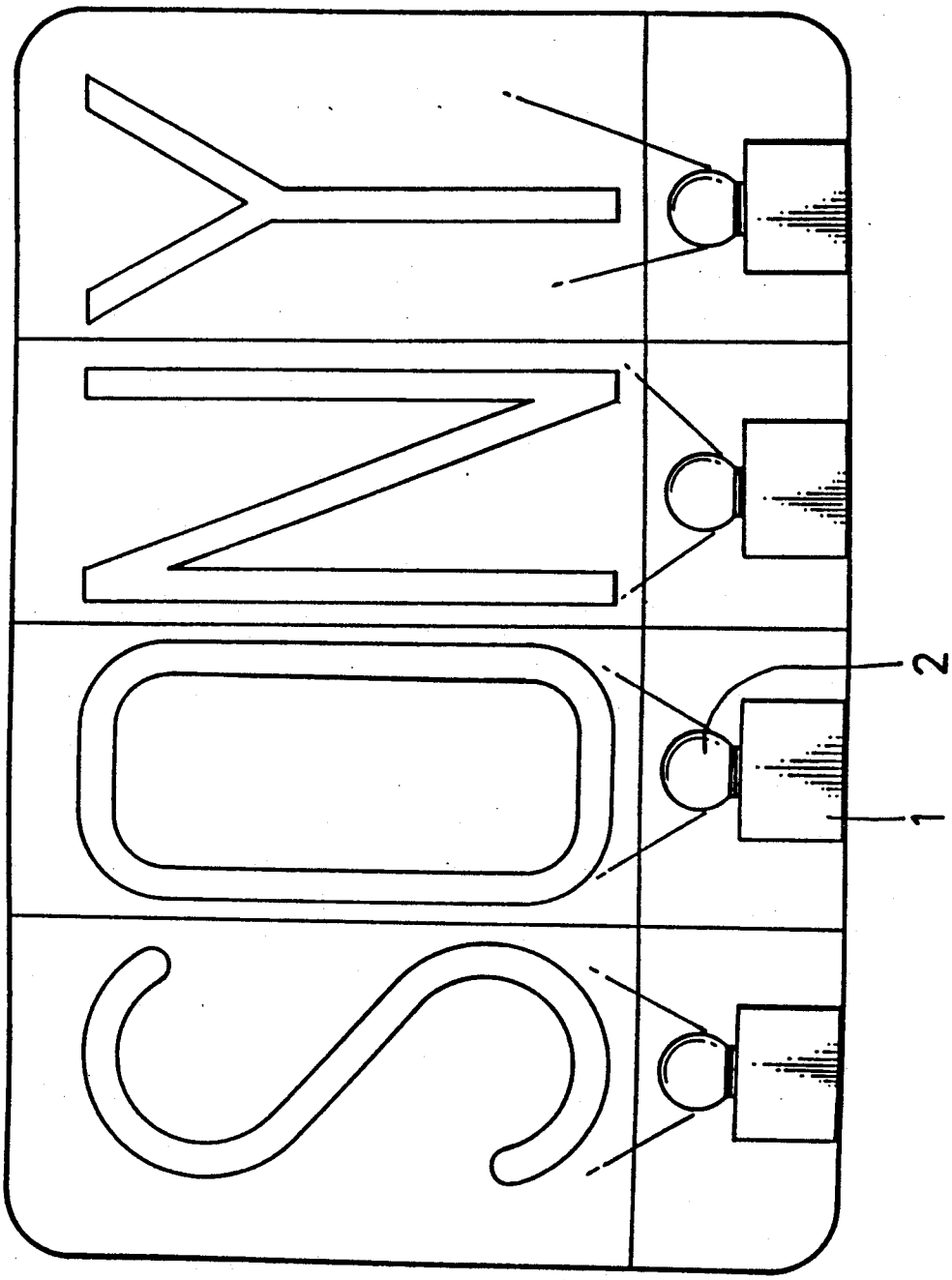
FIG. 3 is a view of the color changing lamp in the present invention applied to an advertising lamp.

A color changing lamp, as shown in FIGS. 1-3 for example to be used for an advertising light, comprises a housing 1, a lamp 2 fixed at the exterior of the housing 1, and a projection shifting device 3 as its main components.

Figure 8:
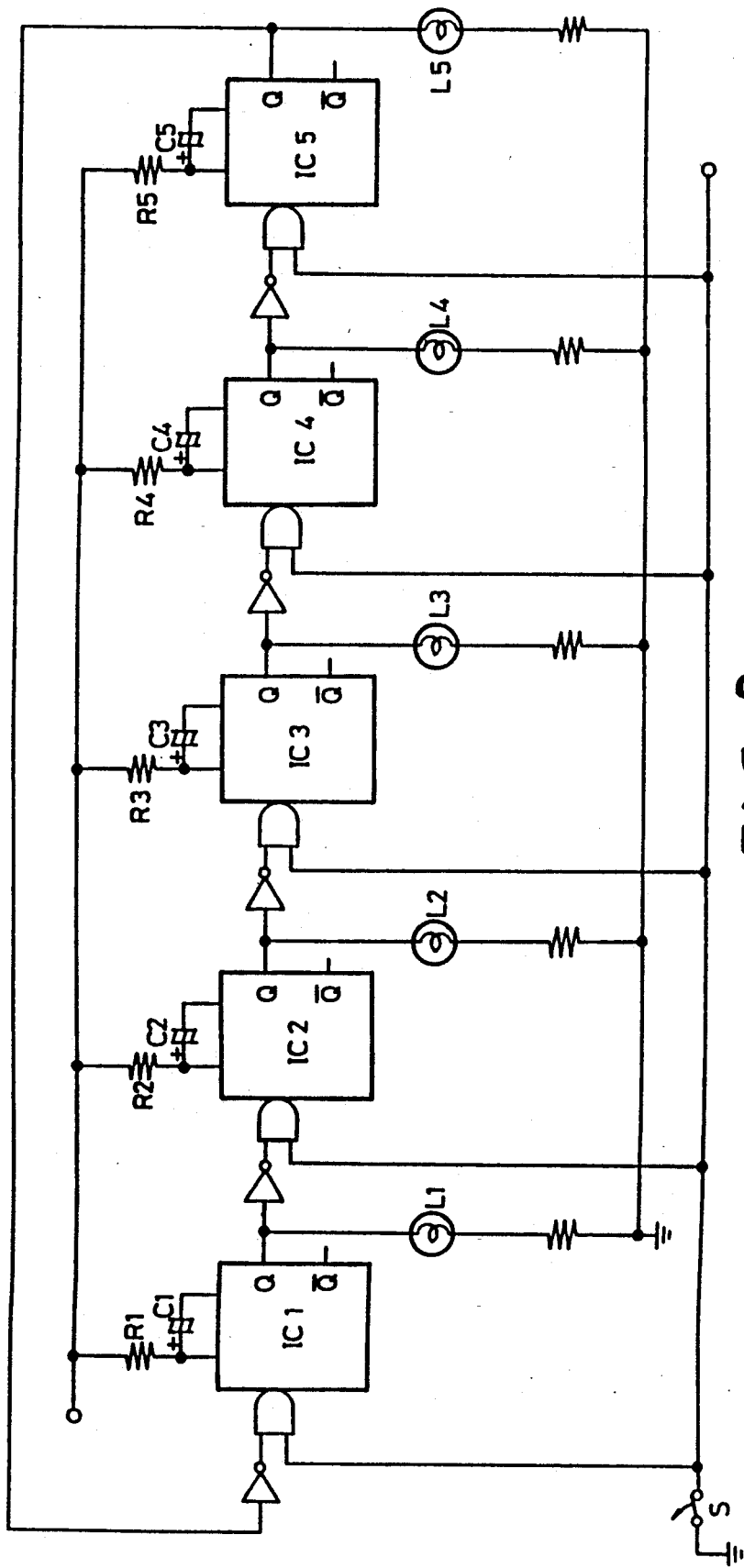
FIG. 8 is a diagram of the lighting order and time control circuit for the light emitters used in a lighting time indicating device in the color changing lamp in the present invention.
Figure 9:
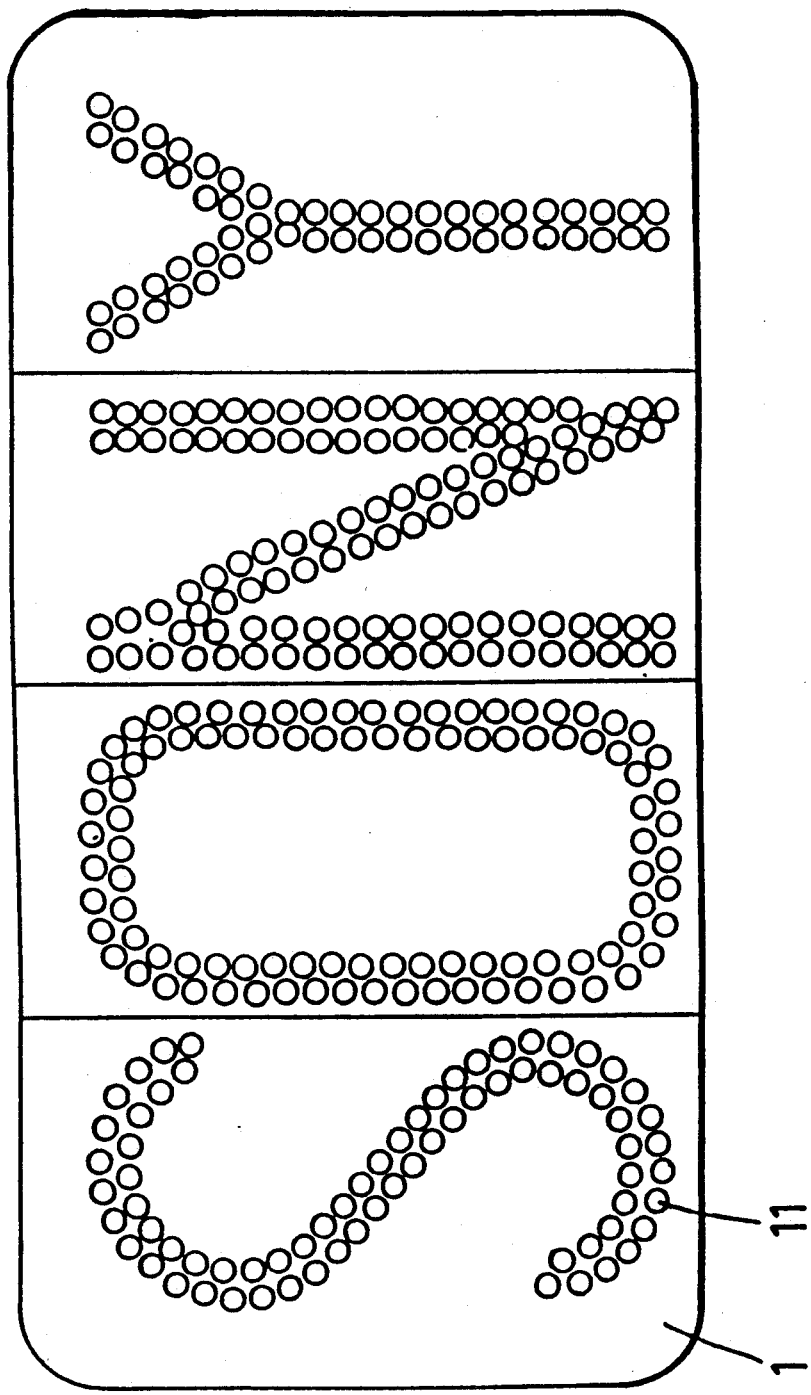
FIG. 9 is a view of a conventional advertising light.
Figure 10:
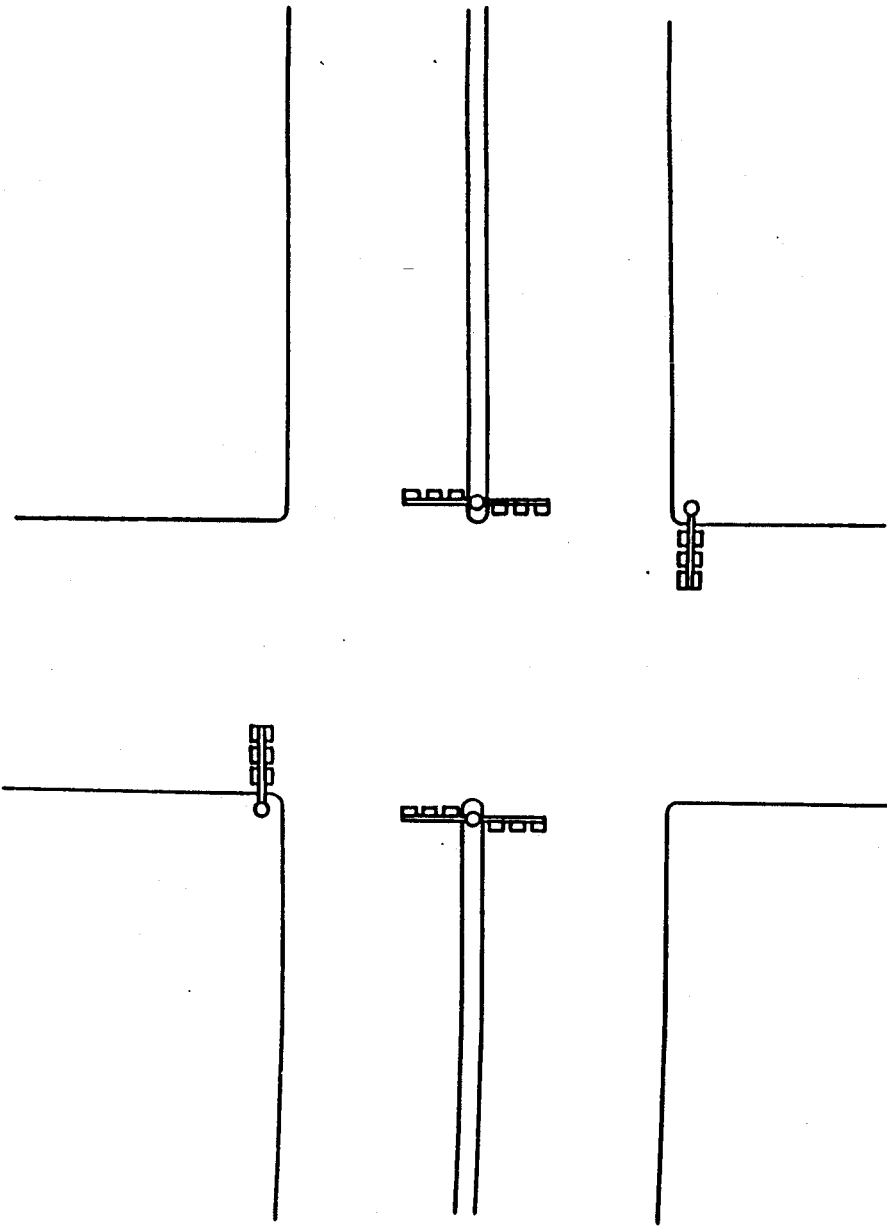
FIG. 10 is a diagram of a conventional traffic lights.

The lamp 2 has a transparent bulb-shaped cover being able to reflect brightly a colored light it receives. The housing 1 has in its interior a lighting time control device comprising a transparent board 211, a plurality of light emitters 212 and a lighting order and time control circuit 213 mounted on a PC board. The light emitters 212 preferably of red color are arranged on the transparent board 211, which has its input connected with the lighting order and time control circuit 213. The lighting order and time control circuit 213 shown in FIG. 8 controls the lighting order and lighting time of all the light emitters 212 according to the color to be used on the lamp 2. A reset key is provided to put out all light emitters 212 for restarting lighting process.

The lighting order and time control circuit 213 contains five mono stable circuits, IC1, IC2, IC3, IC4, IC5 and time control elements R1C1, R2C2, R3C3, R4C4, R5C5. Each IC circuit has its output pin Q connected with each light emitter 212. When a switch S is turned on, the gate of IC1 first becomes high from low, feeding a signal to IC1, which then lights one of the light emitters 212, L1, and after that in order IC2, IC3, IC4, IC5 to light L2, L3, L4, L5. The lighting time of each light emitter 212 can be pre-set by the value of each RC unit.

The projection shifting device 3 fixed in the housing 1, as shown in FIG. 2, includes a light beam generator 32, a power source 33, a concave lens 34, a guide plate 35, a color disc 36, and an automatic color disc rotating device 37.

The light beam generator 32 has two convex lenses and a light bulb to produce parallel light beam having a wave length 589.3 n.m. to be fed to the concave lens 34.

The power source 33 supplies power to the light beam generator 32.

The concave lens 34 receives the parallel light beam from the light beam generator 32 and refracts a focused light beam for passage through a fan-shaped opening 351 in the guide plate 35.

The guide plate 35 has a large opening 351 shaped nearly as a fan having 120 to limit the focused light beam coming through the concave lens 34 positioned between the light beam generator 32 and the bias guide plate 35.

Figure 5:
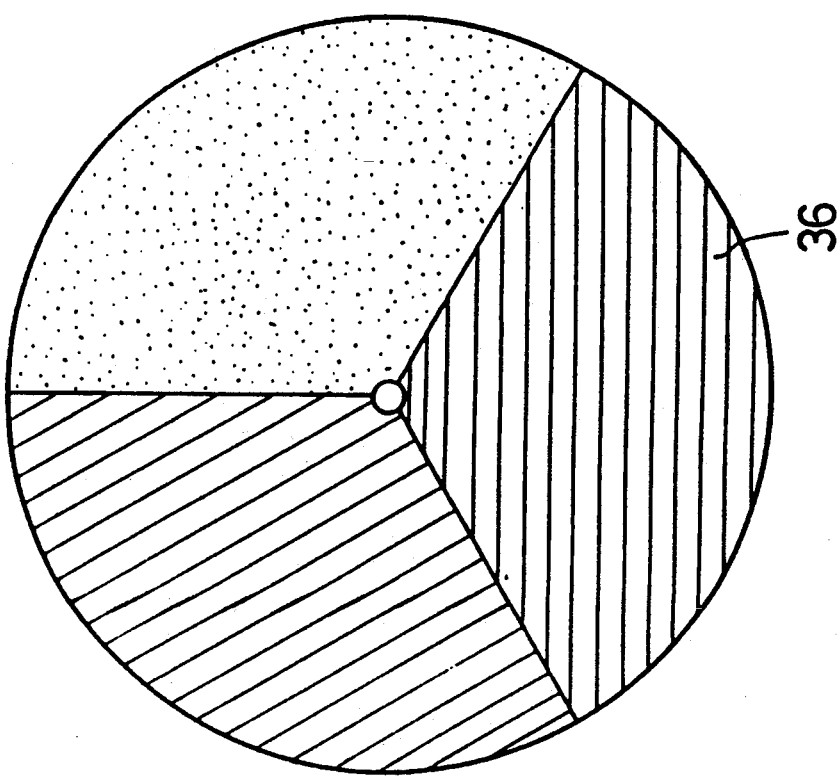
FIG. 5 is a front view of a color disc used in the projection shifting device in the color changing lamp in the present invention.
Figure 7:
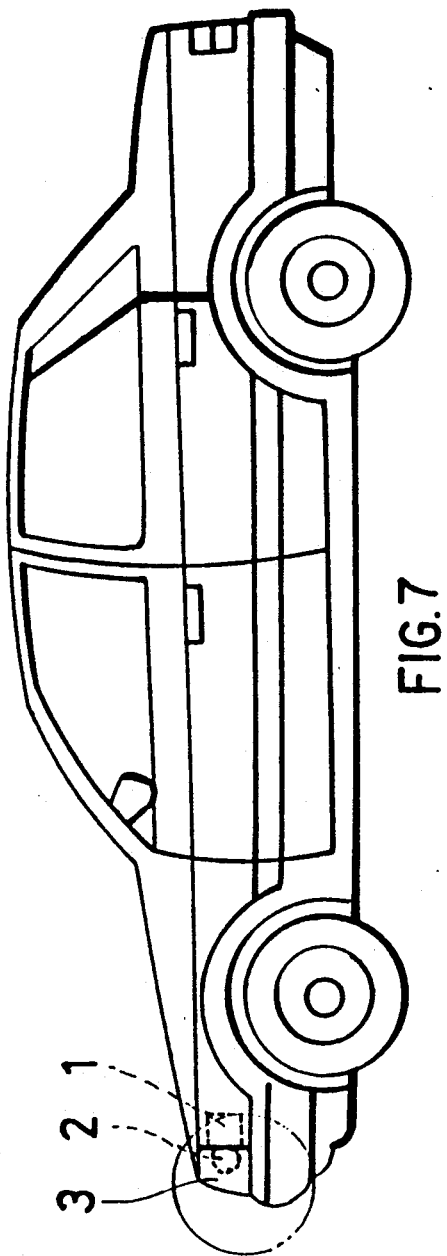
FIGS. 7 and 7A are a perspective view of the color changing lamp in the present invention applied to a headlight and fog light for a car.
Figure 7A:
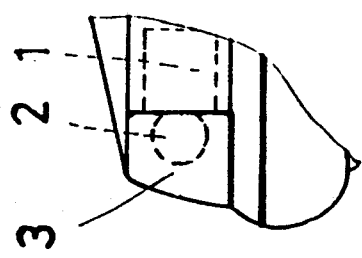

The color disc 36 as shown in FIG. 5 is a circular disc having its entire surface equally divided into a plurality of different colored sections in the radius direction, and said colored sections, for an example, respectively are shaped as a fan having 120 in its angle in case of three sections and colored separately as red, yellow and green, which can reflect its color to a light beam when shined by the light beam.

The automatic color disc rotating device 37 consists of a stepper motor 371 and an angle shifting controller 372 combined together to control the motor 371 to turn for a pre-set angle, for example 120, so that the color disc 36 the center of which is fixed firmly with the shaft of the motor 371 can be turned by the motor 371 for the same angle as the motor turned so as to move one of the colored sections of the color disc 36 to position in line with the guide plate 35 for the light beam coming thrugh the concave lens to pass through the colored section and then the colored light beam to reach the lamp.

Next, the function of this color changing lamp is to be described. Suppose the lighting time of three colors, green yellow and red, is pre-set separately, for example to be 3 minutes, 5 seconds and 2 minutes. The power source 33 at first is made to electrify the light beam generator 32 which then produces a parallel light beam to be focused to pass through the concave lens and then through the opening 351 in the guide plate 35 and then to shine on the surface of one of the three color sections of the color disc 36. In case the color of said color section is coated with green element, the green color element receiving the focused light beam projects on the inner surface of the lamp 2, to reflect a green colored light beam, which fills the interior of the lamp 2 to light it up brightly. Meanwhile, the lighting time indicating device 21 is also started to turn on at the same time when the light beam generator 32 is started, and the lighting order and time control circuit 213 begins to function to light up the five light emitters L1-L5 orderly according to the lighting time of the green light. After the last light emitter L5 is lighted up for the preset time, i.e. fifth of 3 minutes (36 seconds), the color disc 36 is to be turned to another color and the circuit 213 is to reset, turning off all the light emitters 212, L1-L5. Then said control circuit 213 sends a signal to the automatic color disc rotating device 37, which then functions to let the motor 371 rotate for an pre-set angle so that the color disc 36 may be rotated for 120 or one third of a round. Then the next color section, for example yellow, of the color disc 36 can be positioned in line with the guide plate 35 so as to repeat the same projecting process described above, making the lamp 2 to light up with yellow color for five seconds, and so on.

Figure 6:
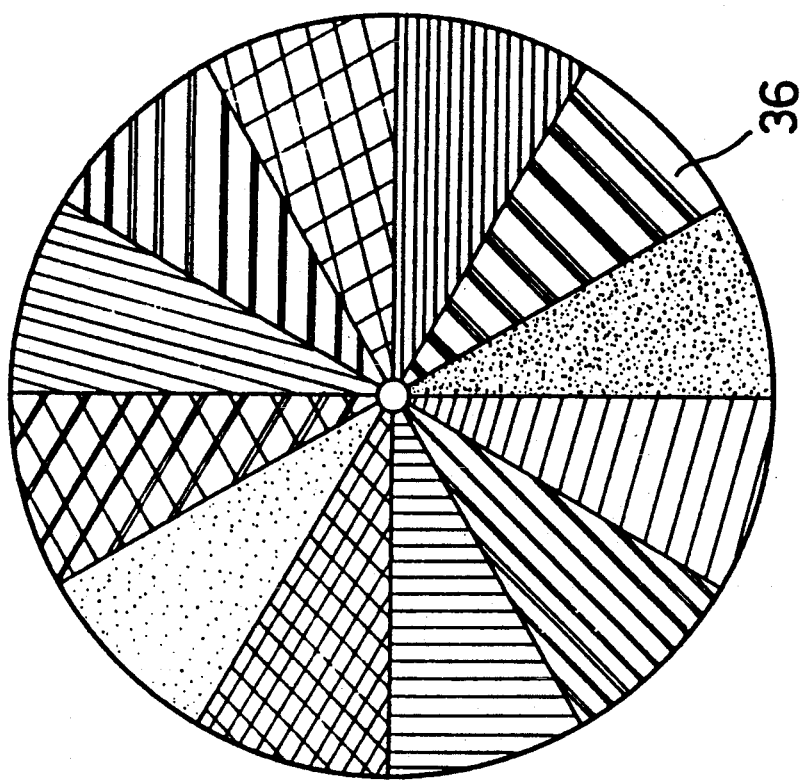
FIG. 6 is a front view of another color disc used in the projection shifting device in the color changing lamp in the present invention.

FIG. 6 shows another embodiment of the color disc 35 in the projection shifting device 3, which has 12 differently colored sections equally divided in the radius direction. But the number of color sections can be as such as needed.

When this color changing lamp is practically applied to an advertisement, it can be positioned at the inner lower portion of an advertising plate so as to obtain the effect as a neon light by color changing or flashing of the lamp 2 to shine on the words or design on the advertising plate. The light emitters 212 and its relative device can be dispensed with if not necessary when it is used for an advertising light.

Figure 4:
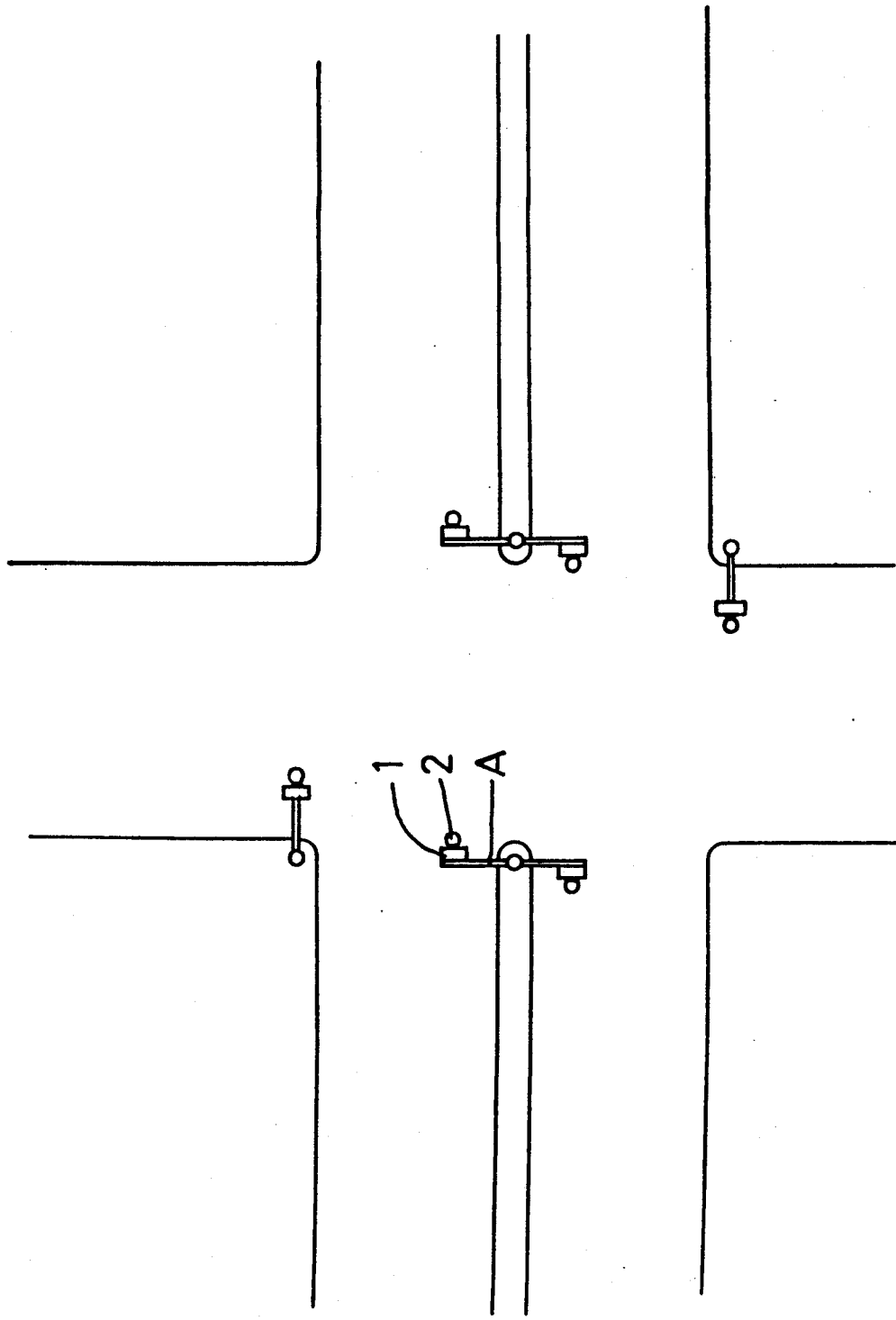
FIG. 4 is a diagram of the color changing lamp in the present invention applied to traffic lights.

This color changing lamp can also be applied to traffic lights as shown in FIG. 4, by fixing the housing 1 on a proper support rod A set at a proper point of a cross road. The lamp 2 can be changed in its color by means of the devices mounted in the housing 1, giving traffic signals for cars and passengers with help of the light emitters 212 to avoid possible accidents by means of lighting time indicating function.

This color changing lamp can also be applied to a headlight and a fog light of a car. Then it is assembled at both the front corners of a car instead of an ordinary head light and an ordinary fog light. Then ordinary head light and an ordinary fog light. Then the lamp 2 can be lighted colorless as a headlight or yellow as a fog light which have the same brightness, shining distance and radiative width as a headlight. As it uses only one lamp, it can save some expense.

In addition, this color changing lamp has a wide application to an illumination light, an ornament light, a water show light, a stage light, etc.

This invention is considered to have the following advantages.

1. It can save not a little expense for many lamps or tubes, power charge and installing work and time when it is used instead of an ordinary advertising light.

2. Its cost is cheaper than a conventional advertising light having a simpler control system, when used as an advertising light.

3. It can save much expense used for 24 common traffic light bulbs by using only four of them as traffic lights.

4. It can indicate the lighting time of a colored lamp by using a plurality of light emitters provided in it and to be lighted for a different period of time according to a different color when used as a traffic light.

5. It can give a simple impression instead of a complicated impression conventional traffic lights do, by using only one lamp differently colored in order.

6. It has wide application to an illumination light, an ornament light, a stage light, a water show light, etc, as well as a traffic light, and an advertising light.

What is claimed is:

1. A color changing lamp comprising:
a housing;
a bulb-shaped, substantially transparent cover member secured to an external surface of said housing for passage of light from internal said housing to an interior of said cover member;

means for indicating a time interval of a predetermined color being emitted through said cover member;

means for changing a projection of one color being emitted through said cover member to another color, said means for changing said projection including means for generating a parallel light beam, a power source for supplying electrical power to said means for generating said light beam, a guide plate mounted within said housing having a fan-shaped opening for passage of said light beam therethrough, a color disc having a plurality of translucent colored segments for rotatable alignment with said fan-shaped opening of said guide plate for passage of light therethrough into said cover member, and means for rotating said color disc to a predetermined location for alignment of at least one colored segment with said fan-shaped opening of said guide plate for transmission therethrough of a predetermined colored light beam.

2. The color changing lamp as recited in claim 1 wherein said means for indicating said time interval of said predetermined color includes a plurality of light emission means mounted on a substantially transparent plate secured to an exterior surface of said housing, said light emission means electrically coupled to an output of means for determining a lighting order and time control circuit coupled to said means for changing said projection of said color whereby said light emission means are actuated responsive to a predetermined light color being emitted from said cover member for indicating the lighting time of said predetermined light color.

3. The color changing lamp as recited in claim 1 wherein said means for rotating said color disc includes a motor shaft angle shifting controller for rotating said color disc through pre-set angular displacements at predetermined time intervals for alignment of one of said color segments with said fan-shaped opening of said guide plate.

4. The color changing lamp as recited in claim 1 where said housing is mounted to an exterior of a vehicle whereby said color changing lamp may function as (1) a headlight or (2) a foglight.

* * * * *